(12) United States Patent
Feder et al.

(10) Patent No.: US 8,116,695 B2
(45) Date of Patent: Feb. 14, 2012

(54) METHOD, DEVICE AND SYSTEM OF REDUCED PEAK-TO-AVERAGE-RATIO COMMUNICATION

(75) Inventors: Meir Feder, Herzliya (IL); Amir Ingber, Petah Tikva (IL)

(73) Assignee: Amimon Ltd, Herzlia (IL)

( * ) Notice: Subject to any disclaimer, the term of this patent is extended or adjusted under 35 U.S.C. 154(b) by 781 days.

(21) Appl. No.: 11/971,934

(22) Filed: Jan. 10, 2008

(65) Prior Publication Data

US 2009/0181628 A1    Jul. 16, 2009

(51) Int. Cl.
  *H04B 1/02*    (2006.01)
  *H04B 7/02*    (2006.01)
  *H03C 7/02*    (2006.01)
(52) U.S. Cl. .................. 455/101; 375/141; 370/204
(58) Field of Classification Search .............. 370/204, 370/207, 209, 331, 503; 375/141; 455/101, 455/129
  See application file for complete search history.

(56) References Cited

U.S. PATENT DOCUMENTS

| 6,178,158 | B1 * | 1/2001 | Suzuki et al. ............ 370/203 |
| 7,450,547 | B2 * | 11/2008 | Kim et al. ............ 370/331 |
| 2004/0252725 | A1 * | 12/2004 | Sun et al. ............ 370/503 |
| 2006/0209745 | A1 | 9/2006 | MacMullan et al. |
| 2006/0209890 | A1 | 9/2006 | MacMullan et al. |
| 2006/0209892 | A1 | 9/2006 | MacMullan et al. |
| 2006/0212911 | A1 | 9/2006 | MacMullan et al. |
| 2006/0215732 | A1 * | 9/2006 | Chen et al. ............ 375/141 |
| 2007/0098063 | A1 | 5/2007 | Reznic et al. |
| 2008/0075191 | A1 * | 3/2008 | Haartsen ............ 375/285 |

FOREIGN PATENT DOCUMENTS

| WO | 2006/101801 | 9/2006 |
| WO | 2006/118964 | 11/2006 |

* cited by examiner

*Primary Examiner* — Christian Hannon
(74) *Attorney, Agent, or Firm* — Eitan Mehulal Law Group (57) ABSTRACT

Some embodiments include devices, methods and/or systems of reduced peak-to-average-ratio communication. An apparatus may include a transmitter to transmit a transmission corresponding to an input signal, wherein the transmitter may include a peak-to-average-ratio-reduction transformer to generate a plurality of transformed data components by applying a predefined peak-to-average-ratio-reduction transform scheme to a plurality of fine constellation data components corresponding to the input signal, wherein a peak-to-average-ratio corresponding to the plurality of transformed data components is lower than a peak-to-average-ratio corresponding to the plurality of fine-constellation data components; and a transmission module to generate the transmission based at least on the plurality of transformed data components. Other embodiments are described and claimed.

15 Claims, 5 Drawing Sheets

METHOD, DEVICE AND SYSTEM OF REDUCED PEAK-TO-AVERAGE-RATIO COMMUNICATION

FIELD

Some embodiments relate generally to the field of communication and, more particularly, to wireless communication including video information.

BACKGROUND

Wireless communication has rapidly evolved over the past decades. Even today, when high performance and high bandwidth wireless communication equipment is made available there is demand for even higher performance at a higher bandwidth.

Video signals may be generated by various video sources, for example, a computer, a game console, a Video Cassette Recorder (VCR), a Digital-Versatile-Disc (DVD), or any other suitable video source. In many houses, for example, video signals are received through cable or satellite links at a Set-Top Box (STB) located at a fixed point.

In many cases, it may be desired to place a screen or projector at a location in a distance of at least a few meters from the video source. This trend is becoming more common as flat-screen displays, e.g., plasma or Liquid Crystal Display (LCD) televisions are hung on a wall. Connection of such a display or projector to the video source through cables is generally undesired for aesthetic reasons and/or installation convenience. Thus, wireless transmission of the video signals from the video source to the screen is preferred.

SUMMARY

Some demonstrative embodiments include an apparatus having a transmitter to transmit a transmission corresponding to an input signal. The transmitter may include a peak-to-average-ratio-reduction transformer to generate a plurality of transformed data components by applying a predefined peak-to-average-ratio-reduction transform scheme to a plurality of fine constellation data components corresponding to the input signal, wherein a peak-to-average-ratio corresponding to the plurality of transformed data components is lower than a peak-to-average-ratio corresponding to the plurality of fine-constellation data components; and a transmission module to generate the transmission based at least on the plurality of transformed data components.

In some demonstrative embodiments, the input signal may include a video signal, the transmission may include a wireless transmission corresponding to the video signal, and the transmission module may include a radio-frequency module.

In some demonstrative embodiments, the transmitter may include a data-component mapper to map a plurality of data components representing the video signal into the plurality of fine-constellation data components and a plurality of coarse-constellation data components. The transmission module may generate the transmission based on the plurality of transformed data components and the plurality of coarse-constellation data components.

In some demonstrative embodiments, the peak-to-average-ratio-reduction transformer is to apply a predefined Hadamard transformation to the fine constellation data components.

In some demonstrative embodiments, the peak-to-average-ratio-reduction transformer is to multiply a block of a pre-defined number of the fine constellation data components by a predefined Hadamard transformation matrix.

In some demonstrative embodiments, the transmitter may include a plurality of antennas to transmit the wireless transmission, and the radio-frequency module may include a framer to construct a wireless transmission frame of the transmission by mapping the transformed data components to a plurality of sets of fine frequency bins, and to apply a predefined antenna-mapping transformation to at least one set of transformed data components, which are mapped to a common fine frequency bin.

In some demonstrative embodiments, the framer is to multiply the set of transformed data components by a Hadamard transformation matrix having a number of rows equal to a number of the plurality of antennas.

In some demonstrative embodiments, the peak-to-average-ratio-reduction transformer may include a divider to divide the fine constellation data components into a plurality of streams, wherein a number of the plurality of streams is equal to a number of the plurality of antennas; and a plurality of transformation modules to apply the transformation to the plurality of streams, respectively, wherein each of the streams may include fine constellation data components to be mapped by the framer to different fine frequency bins.

In some demonstrative embodiments, the transmitter may include a coefficient generator to generate a plurality of transformation coefficients representing the video signal by applying a predefined coefficient-generation transformation to the video signal. The plurality of data components may include the plurality of transformation coefficients.

In some demonstrative embodiments, the coefficient-generation transformation may include a transformation from a spatial domain to a frequency domain.

In some demonstrative embodiments, the coefficient-generation transformation may include a discrete-cosine-transform or a wavelet transformation.

In some demonstrative embodiments, the apparatus may include a video source to generate the video signal.

Some demonstrative embodiments include a method of transmitting transmission corresponding to an input signal, the method may include applying to a plurality of fine constellation data components corresponding to the input signal a predefined peak-to-average-ratio-reduction transform scheme to generate a plurality of transformed data components, wherein a peak-to-average-ratio corresponding to the plurality of transformed data components is lower than a peak-to-average-ratio corresponding to the plurality of fine-constellation data components; and transmitting the transmission based at least on the plurality of transformed data components.

In some demonstrative embodiments, the input signal may include a video signal, and the transmission may include a wireless transmission corresponding to the video signal.

In some demonstrative embodiments, the method may include mapping a plurality of data components representing the video signal into the plurality of fine-constellation data components and a plurality of coarse-constellation data components. The transmitting may include transmitting the wireless transmission based on the plurality of transformed data components and the plurality of coarse-constellation data components.

In some demonstrative embodiments, the applying may include applying a predefined Hadamard transformation to the fine constellation data components.

In some demonstrative embodiments, applying the Hadamard transformation may include multiplying a block of a predefined number of the fine constellation data components by a predefined Hadamard transformation matrix.

In some demonstrative embodiments, transmitting the wireless transmission may include transmitting the wireless transmission via a plurality of antennas, and the method may include constructing a wireless transmission frame of the transmission by mapping the transformed data components to a plurality of sets of fine frequency bins; and applying a predefined antenna-mapping transformation to at least one set of transformed data components, which are mapped to a common fine frequency bin.

In some demonstrative embodiments, applying the antenna-mapping transformation may include multiplying the set of transformed data components by a Hadamard transformation matrix having a number of rows equal to a number of the plurality of antennas.

In some demonstrative embodiments, applying the Hadamard transformation may include dividing the fine constellation data components into a plurality of streams, wherein a number of the plurality of streams is equal to a number of the plurality of antennas; and applying the Hadamard transformation to the plurality of streams, respectively, wherein each of the streams may include fine constellation data components to be mapped to different fine frequency bins.

In some demonstrative embodiments, the method may include applying a predefined coefficient-generation transformation to the video signal to generate a plurality of transformation coefficients representing the video, wherein the plurality of data components may include the plurality of transformation coefficients.

In some demonstrative embodiments, the coefficient-generation transformation may include a transformation from a spatial domain to a frequency domain.

Some demonstrative embodiments include a system including a wireless transmitter to transmit a wireless transmission corresponding to an input video signal, and a wireless receiver to receive the wireless transmission and to generate an output video signal corresponding to the wireless transmission. The transmitter may include a data-component mapper to map a plurality of data components representing the video signal into a plurality of fine-constellation data components and a plurality of coarse-constellation data components; a peak-to-average-ratio-reduction transformer to generate a plurality of transformed data components by applying to the plurality of fine constellation data components a predefined peak-to-average-ratio-reduction transform scheme, wherein a peak-to-average-ratio corresponding to the plurality of transformed data components is lower than a peak-to-average-ratio corresponding to the plurality of fine-constellation data components; and a radio-frequency module to generate the wireless transmission based on the plurality of transformed data components and the plurality of coarse-constellation data components.

In some demonstrative embodiments, the peak-to-average-ratio-reduction transformer is to apply a predefined Hadamard transformation to the fine constellation data components.

In some demonstrative embodiments, the peak-to-average-ratio-reduction transformer is to multiply a block of a predefined number of the fine constellation data components by a predefined Hadamard transformation matrix.

In some demonstrative embodiments, the transmitter may include a plurality of antennas to transmit the wireless transmission, and the radio-frequency module may include a framer to construct a wireless transmission frame of the transmission by mapping the transformed data components to a plurality of sets of fine frequency bins, and to apply a predefined antenna-mapping transformation to at least one set of transformed data components, which are mapped to a common fine frequency bin.

In some demonstrative embodiments, the transmitter may include a coefficient generator to generate a plurality of transformation coefficients representing the video signal by applying a predefined coefficient-generation transformation to the video signal, wherein the plurality of data components comprise the plurality of transformation coefficients.

In some demonstrative embodiments, the system may include a video source to generate the input video signal.

In some demonstrative embodiments, the system may include a video destination to display a video image based on the output video signal.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. Moreover, some of the blocks depicted in the drawings may be combined into a single function. The figures are listed below.

DETAILED DESCRIPTION

In the following detailed description, numerous specific details are set forth in order to provide a thorough understanding of some embodiments. However, it will be understood by persons of ordinary skill in the art that some embodiments be practiced without these specific details. In other instances, well-known methods, procedures, components, units and/or circuits have not been described in detail so as not to obscure the discussion.

Unless specifically stated otherwise, as apparent from the following discussions, it is appreciated that throughout the specification discussions utilizing terms such as "processing," "computing," "calculating," "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

It should be understood that some embodiments may be used in a variety of applications. Although embodiments of the invention are not limited in this respect, one or more of the methods, devices and/or systems disclosed herein may be used in many applications, e.g., civil applications, military applications, medical applications or any other suitable application. In some demonstrative embodiments the methods, devices and/or systems disclosed herein may be used in the field of consumer electronics, for example, as part of any suitable television, video Accessories, Digital-Versatile-Disc (DVD), multimedia projectors, Audio and/or Video (A/V) receivers/transmitters, gaming consoles, video cameras, video recorders, and/or automobile A/V accessories. In some demonstrative embodiments the methods, devices and/or systems disclosed herein may be used in the field of Personal Computers (PC), for example, as part of any suitable desktop PC, notebook PC, monitor, and/or PC accessories. In some demonstrative embodiments the methods, devices and/or systems disclosed herein may be used in the field of professional A/V, for example, as part of any suitable camera, video camera, and/or A/V accessories. In some demonstrative embodiments the methods, devices and/or systems disclosed herein may be used in the medical field, for example, as part of any suitable endoscopy device and/or system, medical video monitor, and/or medical accessories. In some demonstrative embodiments the methods, devices and/or systems disclosed herein may be used in the field of security and/or surveillance, for example, as part of any suitable security camera, and/or surveillance equipment. In some demonstrative embodiments the methods, devices and/or systems disclosed herein may be used in the fields of military, defense, digital signage, commercial displays, retail accessories, and/or any other suitable field or application.

Although embodiments of the invention are not limited in this respect, one or more of the methods, devices and/or systems disclosed herein may be used to wirelessly transmit video signals, for example, High-Definition-Television (HDTV) signals, between at least one video source and at least one video destination. In other embodiments, the methods, devices and/or systems disclosed herein may be used to transmit, in addition to or instead of the video signals, any other suitable signals, for example, any suitable multimedia signals, e.g., audio signals, between any suitable multimedia source and/or destination.

Although some demonstrative embodiments are described herein with relation to wireless communication including video information, embodiments of the invention are not limited in this respect and some embodiments may be implemented to perform wireless communication of any other suitable information, for example, multimedia information, e.g., audio information, in addition to or instead of the video information. Some embodiments may include, for example, a method, device and/or system of performing wireless communication of A/V information, e.g., including audio and/or video information. Accordingly, one or more of the devices, systems and/or methods described herein with relation to video information may be adapted to perform wireless communication of A/V information.

Figure 1:
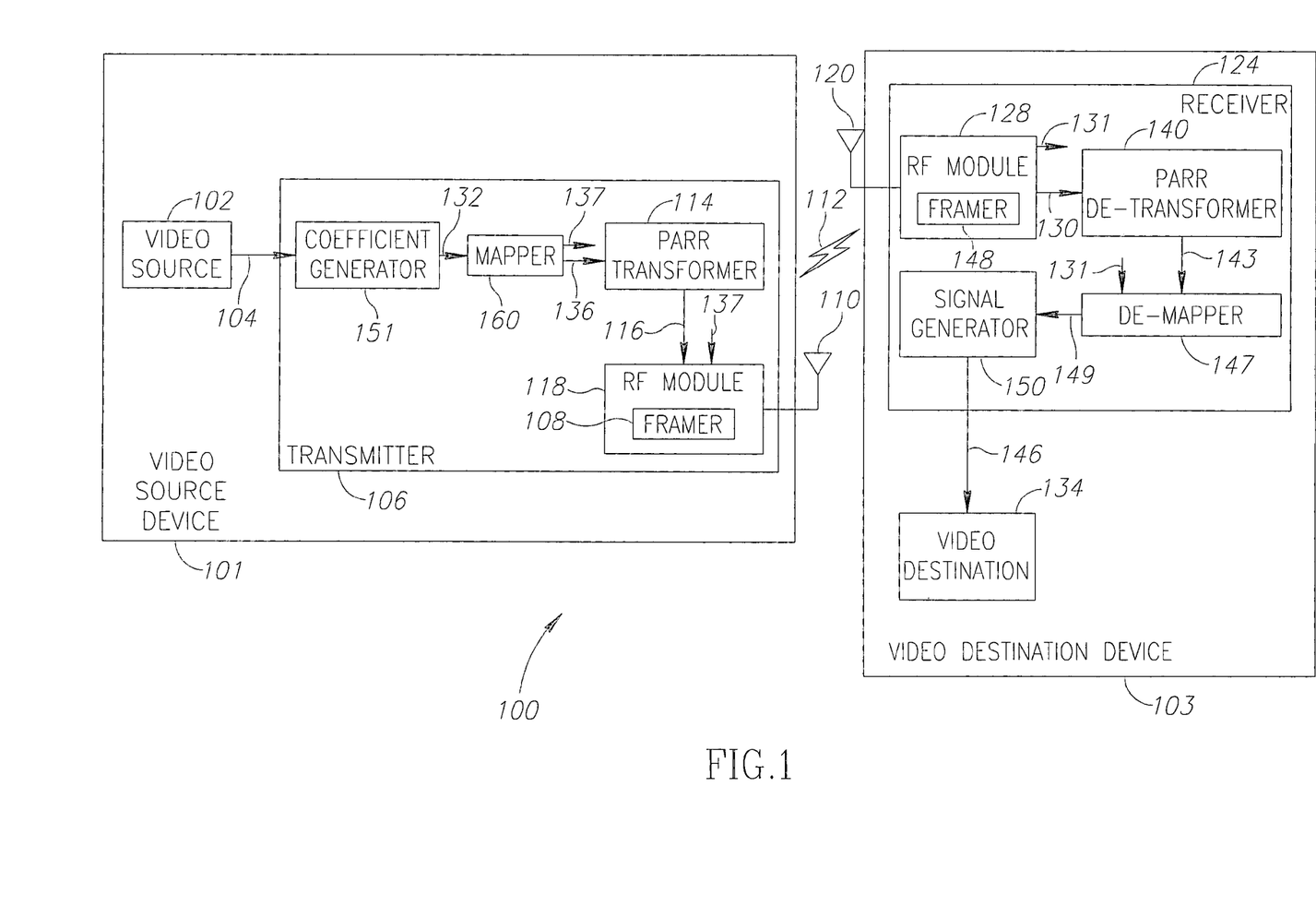
FIG. 1 is a schematic illustration of a wireless video communication system, in accordance with some demonstrative embodiments.

Reference is made to FIG. 1, which schematically illustrates a wireless video communication system 100, in accordance with some demonstrative embodiments.

In some demonstrative embodiments, system 100 may include a wireless transmitter 106 to transmit a wireless video transmission 112, based at least on an input video signal 104. System 100 may also include any suitable video source 102 capable of generating video signal 104, e.g., as described below.

In some demonstrative embodiments, transmission 112 may include a plurality of Peak-to-Average-Ratio (PAR) transformed data components 116, as described below.

In some demonstrative embodiments, transmitter 106 may include a data-component mapper 160 to map a plurality of data components 132 representing video signal 104 into a plurality of fine-constellation data components 136 and a plurality of coarse-constellation data components 137, e.g., as described below.

In some demonstrative embodiments, transmitter 106 may also include a PAR Reducing (PARR) transformer 114 to generate transformed data components 116 by applying a predefined PARR transforming scheme to fine-constellation data components 136, for example, such that a PAR corresponding to transformed data components 116 may be lower than a PAR corresponding to fine-constellation data components 136, e.g., as described in detail below.

In some demonstrative embodiments, transmitter 106 may also include a Radio-Frequency (RF) module 118 to generate wireless transmission 112 based on transformed data components 116 and coarse-constellation data components 137. RF module 118 may modulate data components 116 and 137 according to any suitable modulation scheme, e.g., as described below.

In some demonstrative embodiments, data components 132 may include a plurality of transformation coefficients. For example, transmitter 106 may also include a coefficient generator 151, to generate the transformation coefficients, for example, by applying a predefined coefficient-generation transformation to video signal 104. The coefficient-generation transformation may include, for example, a de-correlating transformation, e.g., a transformation from a spatial domain to a frequency domain. In one example, the coefficient-generation transformation may include a discrete-cosine-transform (DCT) or a wavelet transformation e.g., as described in U.S. patent application Ser. No. 11/551,641, entitled "Apparatus and method for uncompressed, wireless transmission of video", filed Oct. 20, 2006, and published May 3, 2007, as US Patent Application Publication US 2007-0098063 ("the '641 Application"), the entire disclosure of which is incorporated herein by reference. For example, coefficient generator 151 may perform the de-correlating transform on a plurality of color components, e.g., in the format Y—Cr—Cb, representing pixels of video signal 104, as described in the '641 Application.

In some demonstrative embodiments, data components 132 may include transformation coefficients having different frequencies, e.g., as described by the '641 Application. Mapper 160 may map the transformation coefficients into a fine-constellation data components 136 and coarse-constellation data components 137 according to any suitable mapping scheme, for example, as described in the '641 Application. In one example, mapper 160 may map Most Significant Bits (MSBs) and Least Significant Bits (LSBs) of the transformation coefficients to fine-constellation data components 136 and coarse-constellation data components 137 based on any suitable mapping criterion. For example, mapper 160 may map the MSBs representing quantized values of a first set of one or more of the transformation coefficients, e.g., including one or more low frequency coefficients, to coarse-constellation data components 137. Mapper 160 may map to fine-constellation data components 136 the LSBs representing quantization errors of the first set of coefficients, and/or values of a second set of one or more of the transformation coefficients, e.g., including high frequency coefficients, as described in the '641 Application. In one example, the transformation coefficients may be represented by 11-bit values. According to this example, mapper 160 may map three MSBs of each of a plurality of low frequency coefficients to a respective coarse-constellation symbol coarse-constellation data components 137; and map eight LSBs of each of the plurality of low frequency coefficients, together with values of a plurality of high-frequency coefficients to fine constellation symbols of fine-constellation data components 136. A fine constellation symbol of fine-constellation data components 136 may have real and imaginary components, each representing, for example, a LSB component of a coefficient of the transformation coefficients. A plurality of coarse constellation symbols of coarse-constellation data components 137 may represent, for example, MSB components of a plurality of the transformation coefficients, respectively.

In some demonstrative embodiments, PARR transformer 114 may apply a linear transformation to data components 136, for example, a Hadamard transform, e.g., as described below.

In some demonstrative embodiments, transmitter 106 may also include one or more antennas 110 to transmit transmission 112. In some non-limiting embodiments, antennas 110 may include a plurality of antennas, e.g., four antennas as described below. Antennas 110 may include any other suitable number of antennas, for example, a single antenna, multiple transmitting antennas, or any other configuration. Transmitter 106 may implement any suitable transmission method and/or configuration to transmit transmission 112. Although embodiments of the invention are not limited in this respect, in some demonstrative embodiments, transmitter 106 may generate transmission 112 according to an Orthogonal-Division-Frequency-Multiplexing (OFDM) modulation scheme. According to other embodiments, transmitter 106 may generate transmission 112 according to any other suitable modulation and/or transmission scheme.

In some demonstrative embodiments, transmission 112 may include a Multiple-Input-Multiple-Output (MIMO) transmission. For example, RF module 118 may modulate data components 116 according to a suitable MIMO modulation scheme, e.g., as described below.

In some demonstrative embodiments, RF module 118 may include a framer 108 to construct a wireless transmission frame of transmission 112 by mapping transformed data components 116 to a plurality of sets of fine frequency bins, and mapping coarse-constellation components 137 to a plurality of sets of coarse constellation bins; and to apply a predefined antenna mapping transformation to at least one set of data components, which are mapped to a common fine frequency bin, e.g., as described in detail below.

In some demonstrative embodiments, the antenna mapping transformation may correlate values of the set of data components. As a result, an error occurring in transmission of the common frequency bin via at least one of antennas 110 may be "smeared" and/or averaged with the transmission of the common frequency bin via other antennas of antennas 110.

In some demonstrative embodiments, the antenna-mapping transformation may include a Hadamard transform, e.g., a Hadamard transformation matrix having a number of rows equal to a number of antennas 110, e.g., as described below.

In some demonstrative embodiments, system 100 may also include a wireless receiver 124 to receive transmission 112, e.g., via one or more antennas 120. Receiver 124 may demodulate transmission 112, and generate an output video signal 146, e.g., corresponding to video signal 104. Video signal 146 may be provided to a video destination 134, which may include any suitable software and/or hardware to handle video signal 146 in any suitable manner, e.g., as described below.

In some demonstrative embodiments, receiver 124 may implement any suitable reception method and/or configuration to receive transmission 112. Although embodiments of the invention are not limited in this respect, in some embodiments, receiver 124 may receive and/or demodulate transmission 112 according to an OFDM modulation scheme. In other embodiments, receiver 124 may receive and/or demodulate transmission 112 according to any other suitable modulation and/or transmission scheme.

In some demonstrative embodiments, receiver 124 may include a RF module 128 to demodulate transmission 112 into a plurality of PARR transformed fine-constellation data components 130, e.g., corresponding to PARR transformed data components 116; and a plurality of coarse-constellation data components 131, e.g., corresponding to coarse-constellation data components 137. In one example, RF module 128 may demodulate transmission 112 according to a suitable MIMO demodulation scheme.

In some demonstrative embodiments, RF module 128 may include a frame decoder 148, to decode the wireless transmission frame of transmission 112 into fine-constellation data components 130 and coarse-constellation data components 131, e.g., as described below.

In some demonstrative embodiments, receiver 124 may also include a PARR de-transformer 140, to generate a plurality of fine-constellation data components 143, e.g., corresponding to fine-constellation data components 136, by applying to data components 130 a predefined PARR inverse transformation scheme, e.g., an inverse of the PARR transformation scheme applied by PARR transformer 114, as described below.

In some demonstrative embodiments, receiver 124 may also include a de-mapper 147 to de-map fine-constellation data components 143 and coarse-constellation data components 131 into a plurality of data components 149 according to a pre-defined de-mapping scheme, for example, as described in the '641 Application.

In some demonstrative embodiments, receiver 124 may also include a signal generator 150, to generate video signal 146 based on data components 149. For example, signal generator 150 may apply an inverse of the coefficient-generating transformation applied by coefficient generator 151, e.g., an inverse wavelet, an Inverse Discrete Cosine Transform (IDCT), or any other suitable transformation, e.g., as described in the '641 application.

In some demonstrative embodiments, video source 102 and transmitter 106 may be implemented as part of a video source device 101, e.g., such that video source 102 and transmitter 106 are enclosed in a common housing, packaging, or the like. In other embodiments, video source 102 and transmitter 106 may be implemented as separate devices.

In some demonstrative embodiments, video destination 134 and receiver 124 may be implemented as part of a video destination device 103, e.g., such that video destination 134 and receiver 124 are enclosed in a common housing, packaging, or the like. In other embodiments, video destination 134 and receiver 124 may be implemented as separate devices.

In some demonstrative embodiments, transmitter 106 may include or may be implemented as a wireless communication card, which may be attached to video source 102 externally or internally.

In some demonstrative embodiments, receiver 124 may include or may be implemented as a wireless communication card, which may be attached to video destination 134 externally or internally.

Although embodiments of the invention are not limited in this respect, in some demonstrative embodiments video signal 104 may include a video signal of any suitable video format. In one example, signal 104 may include a HDTV video signal, for example, a compressed or uncompressed HDTV signal, e.g., in a Digital Video Interface (DVI) format, a High Definition Multimedia Interface (HDMI) format, a Video Graphics Array (VGA), a VGA DB-15 format, an Extended Graphics Array (XGA) format, and their extensions, or any other suitable video format. Video source 102 may include any suitable video software and/or hardware, for example, a portable video source, a non-portable video source, a Set-Top-Box (STB), a DVD, a digital-video-recorder, a game console, a PC, a portable computer, a Personal-Digital-Assistant, a Video Cassette Recorder (VCR), a video camera, a cellular phone, a television (TV) tuner, a photo viewer, a media player, a video player, a portable-video-player, a portable DVD player, an MP-4 player, a video dongle, a cellular phone, and the like. Video destination 134 may include, for example, a display or screen, e.g., a flat screen display, a Liquid Crystal Display (LCD), a plasma display, a back projection television, a television, a projector, a monitor, an audio/video receiver, a video dongle, and the like. In other embodiments, video signal 104 may include any other suitable video signal, and/or source 102 and/or destination 134 may include any other suitable video modules.

Although embodiments of the invention are not limited in this respect, types of antennas that may be used for antennas 110 and/or 120 may include but are not limited to internal antenna, dipole antenna, omni-directional antenna, a monopole antenna, an end fed antenna, a circularly polarized antenna, a micro-strip antenna, a diversity antenna and the like.

In some demonstrative embodiments, the PARR transforming scheme may include a Hadamard transformation. For example, PARR transformer 114 may multiply a sequence, block, and/or stream of a predefined number, denoted n, of data components 136, indexed 0, 1, ..., n−1, by a Hadamard matrix, denoted $H_n$, having n rows and n columns, e.g., as described below. In one example, the number n may include a power of two, e.g., 4, 16, 64, 128, or 256. In other examples, the number n may include any other suitable number.

In some embodiments, PARR transformer 114 may, divide the sequence of n data components into a plurality of streams of data components, and multiply the data components of the plurality of streams by a respective plurality of Hadamard matrices, e.g., as described below with reference to FIG. 2.

In other embodiments, the PARR transforming scheme may include any other suitable transformation.

A m×m un-normalized Hadamard matrix, denoted $H_m$, may have m rows and m columns, and may include the values "1" and "−1" such that the columns of the Hadamard matrix are mutually orthogonal, e.g., $H_m H_m^T = mI$, wherein $H_m^T$ denotes a transposed matrix corresponding to the matrix $H_m$, and I denotes a unity matrix. Although not limited in this respect, in some embodiments the number m may be a power of 2, e.g., $m = 2^l$, wherein l is any suitable positive integer. Such matrix may be used, for example, to recursively define matrices including larger numbers of rows and of columns, e.g., as described below. In other embodiments, the number m may include any other suitable number.

In one example, a 2×2 un-normalized Hadamard matrix, denoted $H_2$, may be defined as follows:

$$H_2 = \begin{pmatrix} 1 & 1 \\ 1 & -1 \end{pmatrix} \quad (1)$$

The un-normalized Hadamard matrix $H_m$ may be recursively defined, e.g., as follows:

$$H_m = kron(H_2, H_{m/2}) = \begin{bmatrix} H_{m/2} & H_{m/2} \\ H_{m/2} & -H_{m/2} \end{bmatrix} \quad (2)$$

A normalized m×m Hadamard matrix, denoted $H_m'$, may be defined, for example, as follows:

$$H_m' = \frac{1}{\sqrt{m}} H_m \quad (3)$$

The matrix $H_m'$ may have an inverse matrix, e.g., since the matrix $H_m'$ is a regular matrix. The inverse matrix may be equal to $H_m'$, e.g., since the matrix $H_m'$ is symmetric:

$$H'H' = \frac{1}{n} HH = \frac{1}{n} HH^T = \frac{1}{n} nI = I \quad (4)$$

Therefore, in some demonstrative embodiments both the Hadamard transform, e.g., applied by PARR transformer 114, and the inverse Hadamard transform, e.g., applied by PARR de-transformer 140, may include the same normalized Hadamard matrix. It should be understood by one of skill in the art that the terms Hadamard matrix and Hadamard transformation matrix are interchangeable and may be used to perform a Hadamard transform.

In some demonstrative embodiments, PARR transformer 114 may apply to the sequence of n data components 136 the normalized Hadamard matrix $H_n'$, e.g., $H_4'$, $H_{12}'$ $H_{16}'$, $H_{24}'$, $H_{64}'$, $H_{128}'$, $H_{144}'$, $H_{160}'$ $H_{256}'$, and/or any other Hadamard matrix, in accordance with Equation (3).

In some demonstrative embodiments, PARR transformer 114 may divide the sequence of n data components 136 into a plurality of streams, e.g., four streams, and apply to each stream a normalized Hadamard matrix corresponding to length of the stream, e.g., $H_{(n/4)}'$ if the sequence is divided into four streams as described below with reference to FIG. 2.

In some demonstrative embodiments, a PAR corresponding to transformed fine-constellation data components 116 may be lower than a PAR corresponding to fine-constellation data components 136, e.g., as explained in detail below.

In some demonstrative embodiments, a vector, denoted x, of m zero-mean, independent random variables having m respective variances, denoted $\sigma_i^2$, wherein i=1 ... m, may have a covariance matrix, denoted $C_x$, which may be determined as follows:

$$C_x = E[xx^T] = \begin{bmatrix} \sigma_1^2 & 0 & \cdots & 0 \\ 0 & \sigma_2^2 & & \vdots \\ \vdots & & \ddots & 0 \\ 0 & \cdots & 0 & \sigma_m^2 \end{bmatrix} \quad (5)$$

A peak power corresponding to the vector x may be $\max_j (\sigma_j^2)$.

In some demonstrative embodiments, a vector, denoted y, resulting from multiplying the vector x by the normalized Hadamard matrix $H'_m$ may include m random variables having covariance matrix, denoted $C_y$, e.g., as follows:

$$y = H'x \quad (6)$$

$$C_y = E[yy^T] = H'C_x H'^T \quad (7)$$

In some demonstrative embodiments, a total power of the vector y may be equal to the total power of the vector x, e.g., as follows:

$$\sum_i E[y_i^2] = tr(C_y) = tr(H'C_x H'^T) = tr(H'^T H'C_x) = tr(C_x) \quad (8)$$

However, all elements of the vector y may have an equal variance, e.g., as follows:

$$E[y_i^2] = E\left[\left(\sum_j h'_{ij} x_j\right)^2\right] = E\left[\frac{1}{n}\sum_j h_{ij}^2 x_j^2\right] = \frac{1}{n}\sum_j \sigma_j^2 \quad (9)$$

Therefore, the peak power corresponding to the vector y is $$\frac{1}{n}\sum_j \sigma_j^2,$$

which is lower than the peak power $max_j(\sigma_j^2)$ of the vector x.

In some demonstrative embodiments, it may be assumed that the n fine-constellation data components 136 may have the statistical properties of the vector x. Accordingly, a vector of n transformed fine-constellation data components 116 may have the statistical properties of the vector y. Therefore, the peak power of the n transformed fine-constellation data components 116 may be lower than the peak power of n fine-constellation data components 136. According to Equation 9, the variance of the n transformed fine-constellation data components 116 may be equal to the variance of the n fine-constellation data components 136. As a result, the PAR of the n transformed fine-constellation data components 116 may be lower than the PAR of the n fine-constellation data components 136.

In some demonstrative embodiments, the PAR corresponding to the block of n transformed fine-constellation data components 116 may be reduced, for example, by up to approximately a factor of 1/n compared the PAR corresponding to the block of n fine-constellation data components 136, for example, if fine-constellation data components 136 correspond to an edge in a video image of video signal 104, e.g., such that approximately one data component of the n fine-constellation data components 136 has a value substantially different than the values of the other data components.

Figure 2:
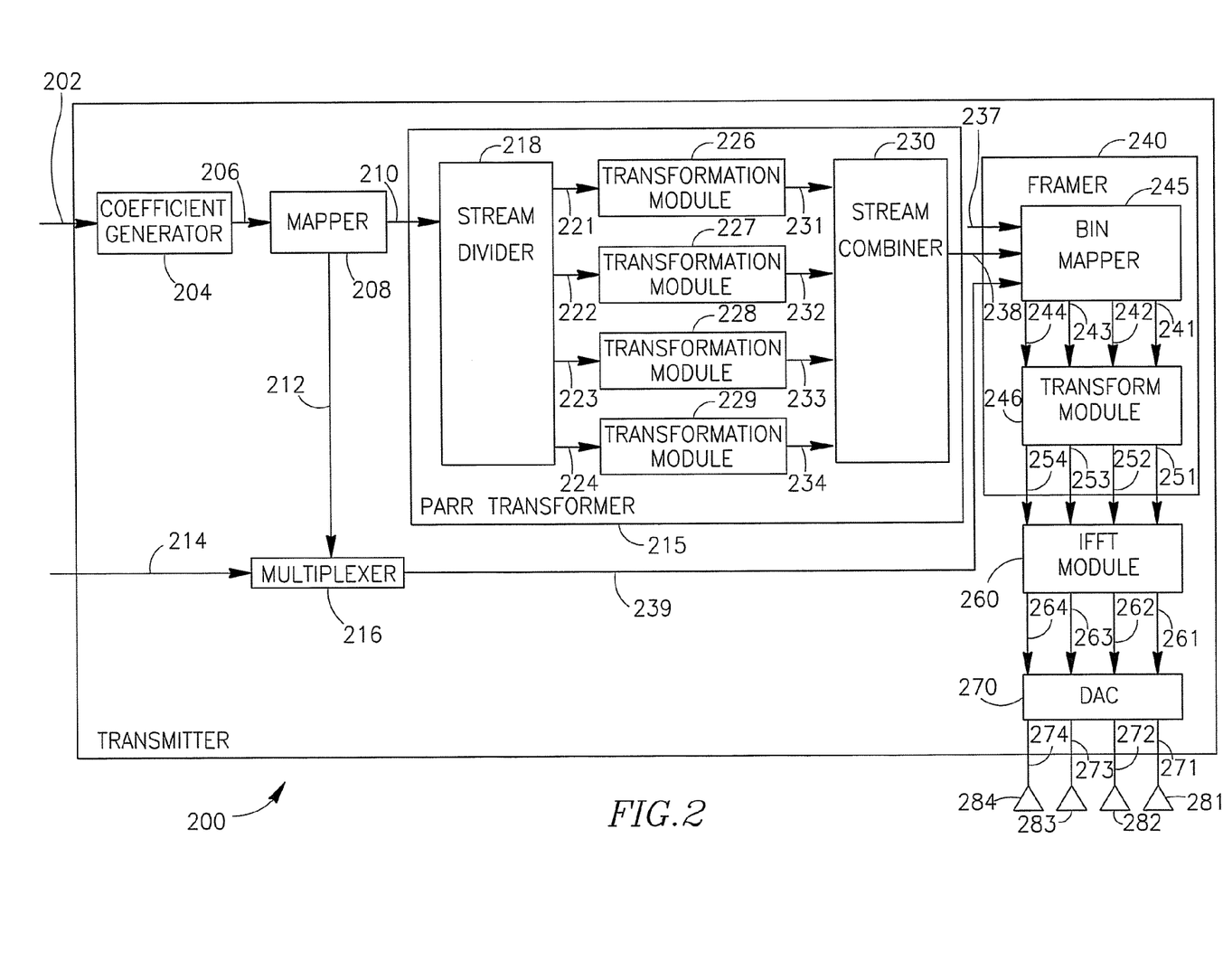
FIG. 2 is a schematic illustration of a wireless transmitter, in accordance with some demonstrative embodiments.

Reference is made to FIG. 2, which schematically illustrates a wireless transmitter 200, in accordance with some demonstrative embodiments. In some non-limiting embodiments, transmitter 200 may perform the functionality of transmitter 106 (FIG. 1).

In some demonstrative embodiments, transmitter 200 may receive a video input signal 202 corresponding, for example, to video signal 104 (FIG. 1), or portions thereof. Transmitter 200 may optionally receive another input signal 214, including, for example, audio information and/or control data, and the like. Based on input signal 202, transmitter 200 may transmit a plurality of transmission video signals, e.g., four signals 271, 272, 273 and 274, via a respective plurality of antennas, e.g., antennas 281, 282, 283 and 284.

In some demonstrative embodiments, transmitter 200 may include a coefficient generator 204 to generate a plurality of coefficients 206 representing input signal 202. Coefficients 206 may include, for example, a stream, vector and/or sequence of coefficients In some demonstrative embodiments, coefficients 206 may include a plurality of transform coefficients. For example, generator 204 may apply to input signal 202 any suitable transformation, e.g., a DCT or a wavelet transform, e.g., as described above with reference to FIG. 1. In other embodiments, transmitter 200 may not include coefficient generator 204, e.g., if signal 202 includes coefficients 206.

In some demonstrative embodiments, transmitter 200 may include a mapper 208 to map coefficients 206 into a first plurality of data components 210, and a second plurality of data components 212. In some demonstrative embodiments, data components 212 may include a plurality of coarse-constellation data components, and data components 210 may include a plurality of fine-constellation coefficient components, e.g., as described above with reference to FIG. 1.

In some demonstrative embodiments, transmitter 200 may include a PARR transformer 215 to generate a plurality of transformed fine-constellation data components 238 by applying to data components 210 a predefined PARR transformation scheme, e.g., as described herein.

In some demonstrative embodiments, transmitter 200 may optionally include a digital data multiplexer 216 to multiplex coarse-constellation data components 212 and data components of input signal 214 into a combined stream of data components 239.

In some demonstrative embodiments, transmitter 200 may include a framer 240 to construct a wireless transmission frame including a predefined number of frequency bins, e.g., 128 frequency bins. Framer 240 may map, for example, transformed fine-constellation data components 238 to a plurality of sets of fine frequency bins, and may map data components 239 to a plurality of sets of coarse frequency bins, e.g., as described below. For example, framer 240 may generate a stream 251 including data components mapped to 128 frequency bins of antenna 281; stream 252 including data components mapped to 128 frequency bins of antenna 282; stream 253 including data components mapped to 128 frequency bins of antenna 283; and/or stream 254 including data components mapped to 128 frequency bins of antenna 284, e.g., as described in detail below.

In some demonstrative embodiments, transmitter 200 may include an Inverse Fast Fourier Transform (IFFT) module 260 to generate streams 261, 262, 263, and 264 by applying a predefined IFFT to streams 251, 252, 253, and 254.

In some demonstrative embodiments, transmitter 200 may also include a Digital to Analog Converter (DAC) 270 to convert signals 261, 262, 263 and 264 into analog signals 271, 272, 273 and 274, respectively, to be transmitted through antennas 281, 282, 283 and 284, respectively.

In some demonstrative embodiments, framer 240 may include a bin mapper 245 to map transformed fine-constellation data components 238 to a plurality of sets of fine frequency bins, map data components 239 to a plurality of sets of coarse frequency bins, and map a pilot signal 237 to a pilot frequency bin, e.g., as described below. For example, bin mapper 245 may generate a stream 241 including data components mapped to 128 frequency bins of antenna 281; stream 242 including data components mapped to 128 frequency bins of antenna 282; stream 243 including data components mapped to 128 frequency bins of antenna 283; and/or stream 244 including data components mapped to 128 frequency bins of antenna 284, e.g., as described in detail below.

Figure 4:
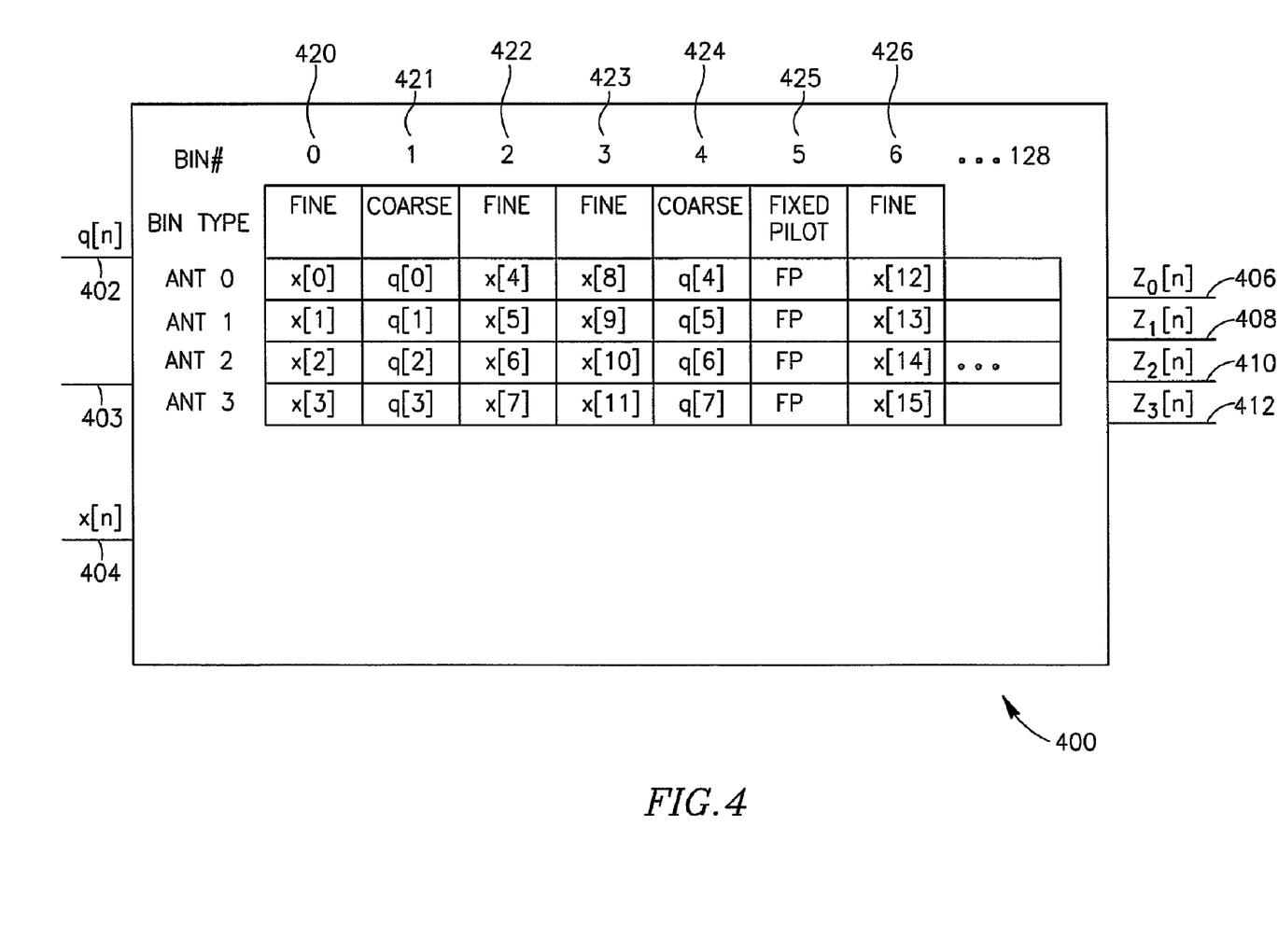
FIG. 4 is a schematic illustration of a bin-mapping scheme, in accordance with some demonstrative embodiments.

Reference is also made to FIG. 4, which schematically illustrates a bin mapping scheme 400 in accordance with some demonstrative embodiments. In some demonstrative embodiments, mapping scheme 400 may be implemented to map a plurality of coarse constellation components 402, a pilot signal 403, and/or a plurality of fine constellation data components 404 into a plurality of frequency bins, e.g., 128 bins, of four streams 406, 408, 410, and 412. In some demonstrative embodiments, mapping scheme 400 may be implemented to de-map the plurality of frequency bins of streams 406, 408, 410, and 412 into coarse constellation components 402, pilot signal 403, denoted FP, and/or fine constellation data components 404.

As shown in FIG. 4, a first set of four fine constellation components, denoted x(0), x(1), x(2), and x(3), respectively, may be mapped to a first fine constellation frequency bin 420 of streams 406, 408, 410, and 412, respectively; a first set of four coarse constellation components, denoted q(0), q(1), q(2), and q(3), respectively, may be mapped to a four symbols of a first coarse constellation frequency bin 421 of streams 406, 408, 410, and 412, respectively; a second set of four fine constellation components, denoted x(4), x(5), x(6), and x(7), respectively, e.g., immediately successive to the first set of fine-constellation data components, may be mapped to four symbols of a second fine constellation frequency bin 422 of streams 406, 408, 410, and 412, respectively; a third set of four fine constellation components, denoted x(8), x(9), x(10), and x(11), respectively, e.g., immediately successive to the second set of fine-constellation data components, may be mapped to four symbols of a third fine constellation frequency bin 423 of streams 406, 408, 410, and 412, respectively; a second set of four coarse constellation components, denoted q(4), q(5), q(6), and q(7), respectively, e.g., immediately successive to the first set of coarse-constellation data components, may be mapped to four symbols of a second coarse constellation frequency bin 424 of streams 406, 408, 410, and 412, respectively; pilot signal 403 may be mapped to four symbols of a pilot frequency bin 425 of streams 406, 408, 410, and 412, respectively; a fourth set of four fine constellation components, denoted x(12), x(13), x(14), and x(15), respectively, e.g., immediately successive to the third set of fine-constellation data components, may be mapped to four symbols of a fourth fine constellation frequency bin 426 of streams 406, 408, 410, and 412, respectively; and so on. Accordingly, in some demonstrative embodiments, each of streams 406, 408, 410 and 412 may include a symbol of each of the plurality of bins.

In some demonstrative embodiments, less than four fine-constellation data components may be mapped to one or more of the fine frequency bins of scheme 400. For example, a specific fine-constellation frequency bin may include only two or three symbols. For example, if bin 422 is to include only three symbols and bin 423 is to include four symbols, then the data components x(4), x(5), and x(6) may be mapped, for example, to bin 422 of streams 406, 408, and 410, respectively, the value zero may be mapped to bin 422 of stream 412, and the data components x(7), x(8), x(9) and x(10) may be mapped to bin 423 of streams 406, 408, 410 and 412, respectively.

Referring back to FIG. 2, in some demonstrative embodiments bin mapper 245 may implement mapping scheme 400 (FIG. 4) to generate streams 241, 242, 243, and 244 including streams 406, 408, 410, and 410 (FIG. 4), respectively. In other embodiments, bin mapper 245 may implement any other suitable bin mapping scheme.

In some demonstrative embodiments, framer 240 may include a transform module 246 to generate streams 251, 252, 253, and 254 by applying to the symbols of streams 241, 242, 243 and 244 a predefined antenna-mapping transformation, e.g., as described below.

In some demonstrative embodiments, transform module 246 may apply the antenna mapping transformation to at least one set of data components, which are mapped to a common fine frequency bin of the plurality of frequency bins. For example, transform module 246 may apply the antenna mapping transformation to each set of data components, which are mapped to each of the fine frequency bins. In one demonstrative embodiment, a fine-frequency bin, denoted z, may include four values corresponding to up to four fine data components of components 238. For example, bin 422 (FIG. 4) may be represented by the vector z(2)=[z0(2), z1(2), z2(2), z3(2)], wherein z0(2), z1(2), z2(2), z3(2) denote the value of bin 422 (FIG. 4) of streams 241, 242, 243, and 244, respectively. In one example, the vector z(2) may be z(2)=[x(4), x(5), x(6), x(7)], e.g., if bin 422 (FIG. 4) includes four symbols; or z(2)=[x(4), x(5), x(6), 0], e.g., if bin 422 (FIG. 4) includes only three symbols, as described above.

In some demonstrative embodiments, transform module 246 may apply a 4×4 Hadamard transform to the at least one set of fine data components. For example, transform module 246 may multiple each set of values of each respective fine-frequency bin by the Hadamard matrix H'$_4$, as defined above. In one example, transform module 246 may apply to the vector z(2) the Hadamard transform, e.g., as follows:

$$\bar{z}[2] = H'_4 z[2] \quad (10)$$

$$= \frac{1}{2} \begin{bmatrix} 1 & 1 & 1 & 1 \\ 1 & -1 & 1 & -1 \\ 1 & 1 & -1 & -1 \\ 1 & -1 & -1 & 1 \end{bmatrix} \begin{bmatrix} x[4] \\ x[5] \\ x[6] \\ 0 \end{bmatrix}$$

$$= \frac{1}{2} \begin{bmatrix} x[4] + x[5] + x[6] \\ x[4] - x[5] + x[6] \\ x[4] + x[5] - x[6] \\ x[4] - x[5] - x[6] \end{bmatrix}$$

In some demonstrative embodiments, as shown by Equation 10 the antenna-mapping transformation may result in "smearing", or diminishing an error occurring in assigning a value to a symbol of fine bin 422 (FIG. 4). For example, if such an error occurs in one of the values, the Hadamard transform may "smears" the error on all four values of coordinates of the vector z(2), thus diminishing the maximal error value, allowing a value of the erroneous symbol to be reconstructed efficiently, for example, by receiver 124 (FIG. 1).

In some demonstrative embodiments, pilot signal 237 may be used for channel estimation. Pilot signal 237 may be mapped to one or more bins. For example, pilot signal 237 may be mapped to a predefined frequency bin ("fixed pilot bin"), e.g., pilot bin 425 (FIG. 4); and/or as a "moving pilot" signal to one or more other frequency bins, e.g., bin 422 (FIG. 4). In some embodiments, transform module 246 may also apply the antenna mapping transformation to one or more of the fixed and/or moving pilot bins. For example, transform module 246 may apply the antenna mapping transformation to fixed pilot bin 425 (FIG. 4) and/or to one or more of the moving pilot bins. Applying the antenna mapping transformation to the pilot bins may omit the need to apply an inverse antenna-mapping transformation to de-transform the wireless transmission, e.g., as described below with reference to FIG. 3.

In some demonstrative embodiments, PARR transformer 215 may include a stream divider 218 to divide fine-constellation data components 210 into a plurality of streams, e.g., including a number of streams equal to the number of antennas of transmitter 200. For example, stream divider 218 my divide fine-constellation data components 210 into four streams, namely, streams 221, 222, 223 and 224.

In some demonstrative embodiments, divider 218 may divide fine constellation data components 210 into streams 221, 222, 223 and 224 according to the bin-mapping scheme, e.g., scheme 400 (FIG. 4), implemented by bin mapper 245. For example, divider 218 may divide a sequence of n data components, indexed 0, 1, . . . , n−1, of fine constellation data components 210 into streams 221, 222, 223 and 224, such that each of streams 221, 222, 223 and 224 includes up to n/4 fine-constellation data components to be mapped by framer 240 to different fine frequency bins, e.g., as described above. The sequence of n components may include, for example, 16, 64, 144, 256, or any other suitable number of fine-constellation data components.

In some demonstrative embodiments, divider 218 may divide each n fine constellation data components such that stream 221 includes the fine-constellation data components having the indexes 4k, wherein k=0 . . . n/4−1; stream 222 includes the fine-constellation data components having the indexes 4k+1, stream 223 includes the fine-constellation data components having the indexes 4k+2; and stream 224 includes the fine-constellation data components having the indexes 4k+3. If, for example, n is not divisible by 4, if -streams 221, 22, 223 and/or 224 are required to have a pre-defined length, and/or if the sum of the lengths of streams 221, 222, 223 and 224 is smaller than n, one or more additional "0" values may be added to one or more of streams 221, 222, 223 and/or 224. In other embodiments, stream divider 218 may divide fine-constellation data components 210 into any other suitable number of streams, e.g., two streams, three streams, five streams, or any other number of streams having equal and/or different lengths.

In some demonstrative embodiments, PARR encoder 215 may include a plurality of transformation modules, for example, transformation modules 226, 227, 228, and 229, to apply a respective plurality of PARR transformations to streams 221, 222, 223, and 224, respectively, to generate transformed streams 231, 232, 233, and 234, respectively, including transformed fine-constellation data components. For example, each of transformation modules 226, 227, 228, and 229 may apply a predefined PARR transformation, e.g., as described below.

In some demonstrative embodiments, the predefined PARR transformation may be, or include, a linear transformation, for example, if streams 221, 222, 223 and/or 224 include only real values. In other demonstrative embodiments, the PARR transformation may be, or include, a non-linear transformation, e.g., a Fast Fourier Transform (FFT), an all-pass filter transformation, for example, if streams 221, 222, 223 and/or 224 include complex values.

In some demonstrative embodiments, the linear transformation may include the Hadamard transform. For example, transformation modules 226, 227, 228, and 229 may multiply the data components of streams 221, 222, 223 and 224, respectively, by a normalized Hadamard matrix, e.g., as described below.

In some demonstrative embodiments, each of transformation modules 226, 227, 228, and 229 may multiply the data components of streams 221, 222, 223 and 224, respectively, by the normalized Hadamard matrix $H_{(n/4)}'$, e.g., in accordance with Equation 3.

In some demonstrative embodiments, a PAR corresponding to transformed fine-constellation data components streams 231, 232, 233, and 234 may be lower than a PAR corresponding to fine-constellation data components streams 221, 222, 223, and 224, respectively, e.g., as explained above with reference to FIG. 1.

In some demonstrative embodiments, PARR encoder 215 may also include a stream combiner 236 to combine streams 231, 232, 233, and 234 into a combined stream of transformed fine-constellation data components 238. Stream combiner 236 may use, for example, a generally reverse scheme to the scheme implemented by stream divider 218. For example, combiner 236 may combine the transformed fine constellation data components of each of streams 231, 232, 233, and 234 such that the ordering of transformed fine constellation data components 238 corresponds to the ordering of fine constellation data components 210. In one example, stream combiner 236 may associate consecutive data components of stream 231 with data components having an index 4k in stream 238; consecutive data components of stream 232 with data components having index values 4k+1 in stream 238; consecutive data components of stream 233 with data components having index values 4k+2 in stream 238; and consecutive data components of stream 234 with data components having index values 4k+3 in stream 238.

Figure 3:
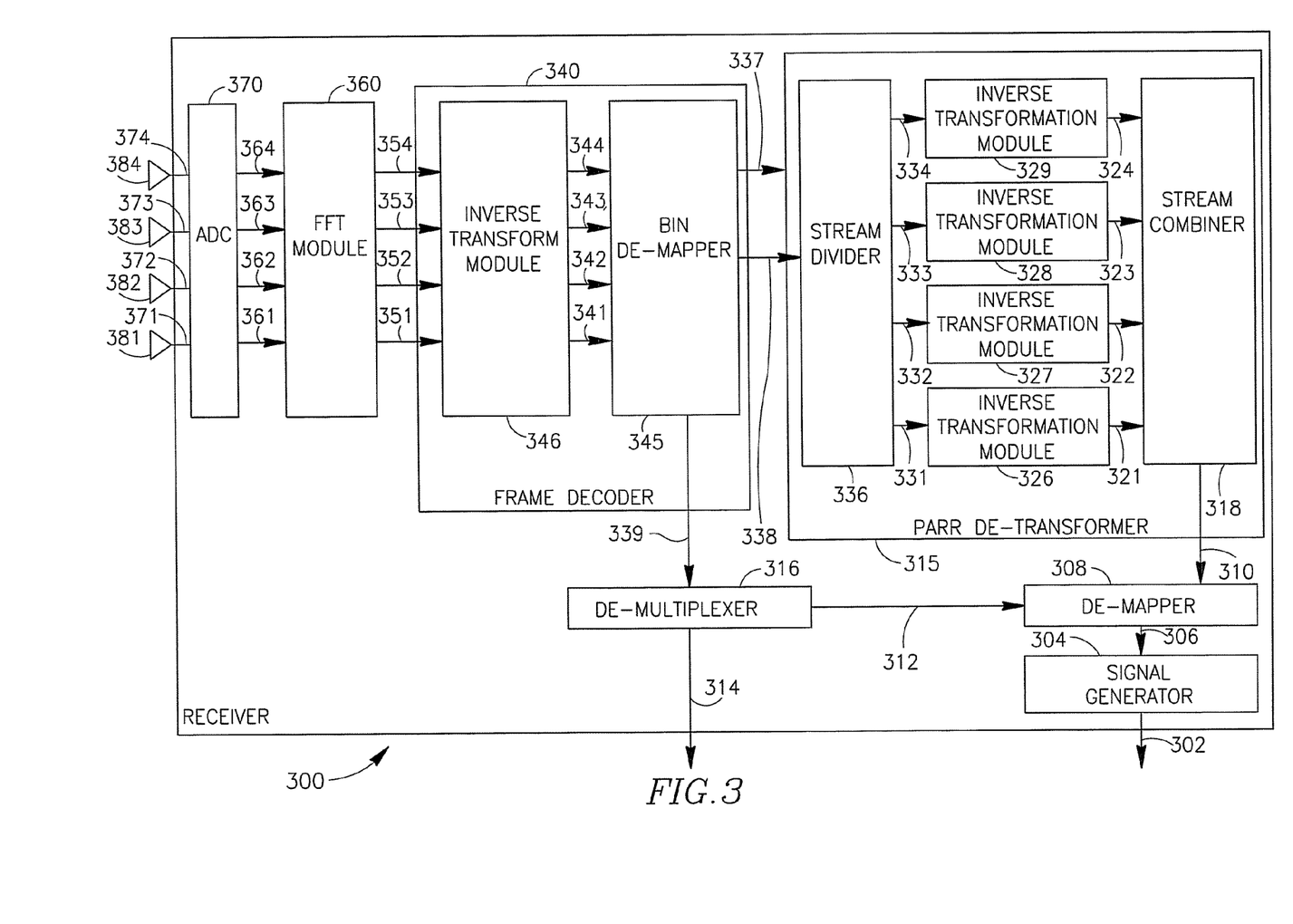
FIG. 3 is a schematic illustration of a wireless receiver, in accordance with some demonstrative embodiments.

Reference is made to FIG. 3, which schematically illustrates a wireless receiver 300, in accordance with some demonstrative embodiments. In some non-limiting embodiments, receiver 300 may perform the functionality of receiver 124 (FIG. 1).

In some demonstrative embodiments, receiver 300 may receive a plurality of signals, e.g., four signals 371, 372, 373 and 374, via a plurality of antennas, e.g., antennas 381, 382, 383, and 384, respectively. Receiver 300 may generate an output video signal 302, e.g., corresponding to signal 202 (FIG. 2), based on signals 371, 372, 373 and 374. Receiver may optionally generate another output signal 314, e.g., corresponding to signal 214 (FIG. 2), e.g., based on signals 371, 372, 373 and 374.

In some demonstrative embodiments, one or more elements of receiver 300 may perform one or more operations similar, or generally identical to the operations of one or more respective elements of transmitter 200 (FIG. 2); and/or one or more elements of receiver 300 may perform one or more operations generally inverse to the operations of one or more respective elements of transmitter 200 (FIG. 2), e.g., as described below.

In some demonstrative embodiments, receiver 300 may include an Analog-to-Digital Converter (ADC) 370, to convert signals 371, 372, 373, and 374 into digital streams 361, 362, 363, and 364, respectively.

In some demonstrative embodiments, receiver 300 may include a Fast Fourier Transform (FFT) module 360 to generate streams 354, 353, 352, and 351 by applying a predefined FFT, e.g., inverse to the IFFT performed by IFFT module 260 (FIG. 2), to streams 361, 362, 363, and 364.

In some demonstrative embodiments, receiver 300 may include a frame decoder 340, to decode symbols of frequency bins of streams 351, 352, 353 and 354 into fine-constellation data components 338, coarse-constellation data components 339, and a pilot signal 337, e.g., as described below.

In some demonstrative embodiments, receiver 300 may also include a PARR de-transformer 315, to generate a plurality of fine-constellation data components 310, e.g., corresponding to fine-constellation data components 338, by applying to data components 338 a predefined PARR inverse transformation scheme, e.g., an inverse of the PARR transformation scheme applied by PARR transformer 215 (FIG. 2), as described below.

In some demonstrative embodiments, receiver 300 may optionally include a de-multiplexer 316 to divide data components 339 into a plurality of coarse-constellation data components 312 and data components of signal 314.

In some demonstrative embodiments, receiver 300 may also include a de-mapper 308 to de-map fine-constellation data components 310 and coarse-constellation data components 312 into a plurality of data components 306 according to a pre-defined de-mapping scheme, for example, as described in the '641 Application.

In some demonstrative embodiments, receiver 300 may also include a signal generator 304, to generate video signal 302 based on data components 306. For example, signal generator 304 may apply an inverse of the coefficient-generating transformation applied by coefficient generator 204 (FIG. 2).

In some demonstrative embodiments, frame decoder 340 may include an inverse transform module 346 to generate streams 341, 342, 343, and 344 by applying to symbols of streams 351, 352, 353, and 354 a predefined antenna-mapping inverse transformation. For example, transform module 346 may apply to the symbols of streams 351, 352, 353, and 354 an inverse of the antenna-mapping transformation implemented by transform module 246 (FIG. 2).

In some demonstrative embodiments, transform module 346 may apply the antenna mapping inverse transformation to at least one set of data components, which are mapped to a common fine frequency bin of the plurality of frequency bins. For example, transform module 346 may apply the antenna mapping transformation to each set of data components, which are mapped to each of the fine frequency bins, e.g., as described above. In one example, transform module 346 may apply a 4×4 Hadamard transform to the at least one set of fine data components. For example, transform module 346 may multiple each set of values of each respective fine-frequency bin by the Hadamard matrix $H'_4$, as defined above.

In other demonstrative embodiments, transform module 346 may be omitted from framer 340, for example, if an antenna mapping transform has been applied to pilot signal 237, e.g., by transmitter 200 (FIG. 2), since for example, receiver 300 may treat the antenna-mapping transform as part of the MIMO channel, and may cancel the antenna-mapping transform as a part of an equalization process.

In some demonstrative embodiments, framer 340 may include a bin de-mapper 345 to de-map symbols of streams 341, 342, 343, and 344 into data components 338, data components 339, and pilot signal 337. For example, de-mapper 345 may de-map the symbols of streams 341, 342, 343, and 344 according to bin-mapping scheme 400 (FIG. 4), e.g., by performing an inverse of the mapping operation performed by bun mapper 345 (FIG. 3).

In some demonstrative embodiments, PARR de-transformer 315 may include a stream divider 336 to divide fine-constellation data components 338 into a plurality of streams, e.g., including a number of streams equal to the number of antennas of transmitter 200 (FIG. 2). For example, stream divider 336 my divide fine-constellation data components 338 into four streams, namely, streams 331, 332, 333, and 334.

In some demonstrative embodiments, divider 336 may divide fine constellation data components 338 into streams 331, 332, 333, and 334 according to the bin-mapping scheme, e.g., scheme 400 (FIG. 4), implemented by bin de-mapper 345. For example, divider 336 may divide a sequence of n data components of fine constellation data components 338 into streams 331, 332, 333 and 334, such that each of streams 331, 332, 333 and 334 includes up to n/4 fine-constellation data components de-mapped by de-mapper 345 to different fine frequency bins, e.g., as described above.

In some demonstrative embodiments, PARR de-transformer 315 may include a plurality of inverse transformation modules, for example, four inverse transformation modules 326, 327, 328 and 329, to apply to apply a respective plurality of PARR inverse transformations to streams 331, 332, 333, and 334, respectively, to generate streams 321, 322, 323, and 324, respectively, including fine-constellation data components. For example, each of transformation modules 326, 327, 328 and 329, may apply an inverse of the PARR transformation applied by transformation modules 226, 227, 228, and 229 (FIG. 2), respectively. In one example, each of inverse transformation modules 326, 327, 328, and 329 may multiply the data components of streams 331, 332, 333 and 334, respectively, by the normalized Hadamard matrix $H_{(n/4)}'$, e.g., as described above.

In some demonstrative embodiments, PARR de-transformer 315 may include a stream combiner 318 to combine streams 321, 322, 323, and 324 into a combined stream of fine-constellation data components 310. Stream combiner 318 may use, for example, a generally reverse scheme to the scheme implemented by stream divider 336. For example, combiner 318 may combine the fine constellation data components of each of streams 321, 322, 323, and 324 such that the ordering of fine constellation data components 310 corresponds to the ordering of fine constellation data components 338.

Figure 5:
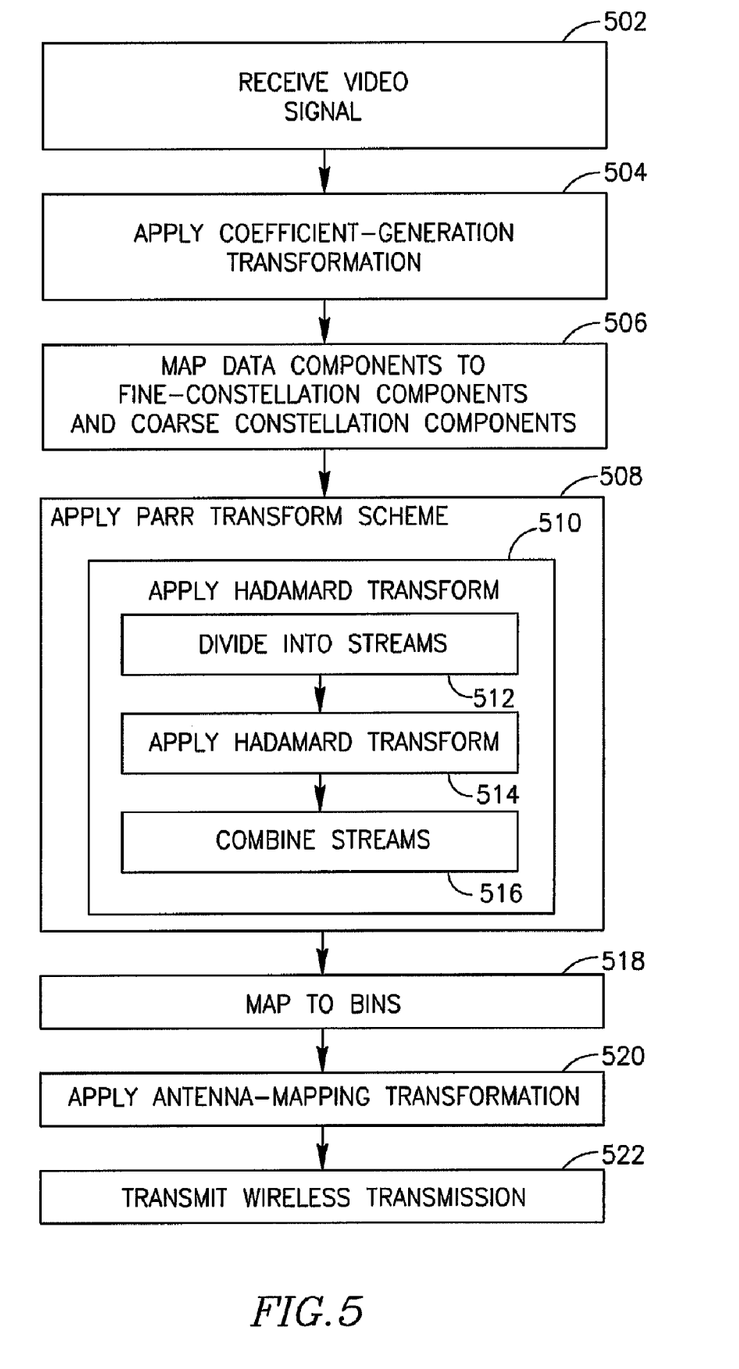
FIG. 5 is a schematic flow-chart illustration of a method of wireless video communication, in accordance with some demonstrative embodiments.

Reference is now made to FIG. 5, which schematically illustrates a method of wireless video communication, in accordance with some demonstrative embodiments. In some non-limiting embodiments, one or more operations of the method of FIG. 5 may be performed by one or more elements of a wireless video communication system, e.g., system 100 (FIG. 1).

As indicated at block 502, the method may include receiving a video signal from a video source. For example, transmitter 106 (FIG. 1) may receive video signal 104 (FIG. 1) from video source 102 (FIG. 1), e.g., as described above.

As indicated at block 506, the method may include mapping a plurality of data components representing the video signal into a plurality of fine-constellation data components and a plurality of coarse-constellation data components. For example, mapper 160 (FIG. 1) may map data components 132 (FIG. 1) into fine-constellation data components 136 and coarse-constellation data components 137 (FIG. 1), e.g., as described above.

As indicated at block 504, the method may optionally include applying a predefined coefficient-generation transformation to the video signal to generate a plurality of transformation coefficients representing the video, wherein the plurality of data components include the plurality of transformation coefficients. For example, coefficient generator 151 (FIG. 1) may generate data components 132 (FIG. 1) by applying the coefficient-generation transformation to video signal 104 (FIG. 1). The coefficient-generation transformation may include, for example, a transformation from a spatial domain to a frequency domain, e.g., as described above.

As indicated at block 508, the method may include applying to the plurality of fine constellation data components a PARR transform scheme to generate a plurality of transformed data components. A PAR corresponding to the plurality of transformed data components may be lower than a PAR corresponding to the plurality of fine-constellation data components. For example, PARR transformer 114 may generate transformed fine-constellation data components 116 (FIG. 1), e.g., as described above.

As indicated at block 510, applying the PARR transformation scheme may include, for example, applying a predefined Hadamard transformation to the fine constellation data components. For example, applying the Hadamard transformation may include multiplying a block of a predefined number of the fine constellation data components by a predefined Hadamard transformation matrix, e.g., as described above.

As indicated at block 518, the method may include constructing a wireless transmission frame by mapping the transformed data components to a plurality of sets of fine frequency bins, e.g., as described above.

As indicated at block 520, the method may include applying a predefined antenna-mapping transformation to at least one set of transformed data components, which are mapped to a common fine frequency bin. For example, applying the antenna-mapping transformation may include multiplying the set of transformed data components by a Hadamard transformation matrix having a number of rows equal to a number of a plurality of antennas for transmitting the wireless transmission.

As indicated at block 522, the method may include transmitting the wireless transmission based on the plurality of transformed data components and the plurality of coarse-constellation data components. For example, RF module 118 (FIG. 1) may transmit wireless transmission 112 (FIG. 112), e.g., as described above.

As indicated at block 512, applying the Hadamard transformation may include dividing the fine constellation data components into a plurality of streams, wherein a number of the plurality of streams is equal to a number of the plurality of antennas, wherein each of the streams includes fine constellation data components to be mapped to different fine frequency bins, e.g., as described above with reference to FIG. 2.

As indicated at block 514, applying the Hadamard transformation may also include applying the Hadamard transformation to the plurality of streams, respectively, e.g., as described above with reference to FIG. 2.

As indicated at block 516, applying the Hadamard transformation may also include combining the plurality of streams of fine constellation data components into a single stream, e.g., as described above with reference to FIG. 2.

Other operations or sets of operations may be used in accordance with some embodiments.

Some embodiments, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and/or an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising a transmitter to transmit a transmission corresponding to a video input signal, said transmitter comprising:

a transformer to generate a set of transformed transmission symbol values by applying a reversible transform to an original set of transmission symbol values derived from portions of said video input signal such that the transformed transmission values have a lower peak-to-average-ratio than the original set of transmission symbol values;

a radio frequency transmission module to generate said transmission based at least on said set of transformed symbol values;

wherein said transmitter comprises a data-component mapper to map a plurality of data components representing said video signal into said original set of transmission symbol values; and wherein said transmitter comprises a coefficient generator to generate a plurality of transformation coefficients representing said video signal by applying a predefined coefficient-generation transformation from a spatial domain to a frequency domain to said video signal, and wherein said original set of transmission symbol values comprise said plurality of transformation coefficients.

2. The apparatus of claim 1, wherein said transformer is adapted to apply a Hadamard transformation to said original set of transmission symbol values.

3. The apparatus of claim 2, wherein said transformer is adapted to multiply a block of a predefined number of original transmission symbol values by a predefined Hadamard transformation matrix.

4. The apparatus of claim 2, wherein said transmitter comprises a plurality of antennas to transmit said wireless transmission, and wherein said radio-frequency module comprises a framer to construct a wireless transmission frame of said transmission by mapping said transformed set of transmission symbol values to frequency bins, and to apply a predefined antenna-mapping transformation to at least one set of transformed transmission symbol values, which are mapped to a common frequency bin.

5. The apparatus of claim 4, wherein said framer is adapted to multiply a set of transformed transmission symbol values by a Hadamard transformation matrix having a number of rows equal to a number of said plurality of antennas.

6. The apparatus of claim 4, wherein said transformer comprises: a divider to divide said original set of transmission symbol values into a plurality of streams; and a plurality of transformation modules to apply said transformation to said plurality of streams.

7. The apparatus of claim 1, wherein said coefficient-generation transformation comprises a discrete-cosine-transform or a wavelet transformation.

8. The apparatus of claim 1 comprising a video source to generate said video signal.

9. A method of transmitting a radio frequency transmission corresponding to a video input signal, said method comprising:
applying to a plurality of original set of transmission symbol values corresponding to said video input signal a reversible transform to generate a plurality of transformed set of transmission symbol values having a peak-to-average-ratio lower than a peak-to-average-ratio lower than the original set of transmission symbol values; and transmitting said radio frequency transmission based at least on said transformed set of transmission symbol values;
comprising mapping a plurality of data components representing said video signal into said original set of transmission symbol values, wherein said transmitting comprises transmitting said wireless transmission based on said transformed set of transmission symbol values;
wherein said applying comprises applying a predefined Hadamard transformation to said original set of transmission symbol values; and
wherein transmitting said wireless transmission comprises transmitting said wireless transmission via a plurality of antennas, and wherein said method comprises: constructing a wireless transmission frame of said transmission by mapping said transformed set of transmission symbol values to a plurality of sets of fine frequency bins.

10. The method of claim 9, wherein applying said Hadamard transformation comprises multiplying a block of a number of said original transmission symbol values by a predefined Hadamard transformation matrix.

11. The method of claim 9, wherein applying said antenna-mapping transformation comprises multiplying said set of transformed symbol values by a Hadamard transformation matrix having a number of rows equal to a number of said plurality of antennas.

12. The method of claim 9, wherein applying said Hadamard transformation comprises: dividing said original set of transmission symbol values into a plurality of streams; and applying said Hadamard transformation to said plurality of streams, respectively.

13. The method of claim 9 comprising applying a predefined coefficient-generation transformation to said video signal to generate a plurality of transformation coefficients representing said video, and wherein said original set of transmission symbol values comprise said plurality of transformation coefficients.

14. The method of claim 13, wherein said coefficient-generation transformation comprises a transformation from a spatial domain to a frequency domain.

15. A method of transmitting a radio frequency transmission corresponding to a video input signal, said method comprising:
applying to a plurality of original set of transmission symbol values corresponding to said video input signal a reversible transform to generate a plurality of transformed set of transmission symbol values having a peak-to-average-ratio lower than a peak-to-average- ratio lower than the original set of transmission symbol values; and
transmitting said radio frequency transmission based at least on said transformed set of transmission symbol values, wherein said transmitting comprises a wireless transmission corresponding to said video input signal;
mapping a plurality of data components representing said video input signal into an original set of transmission symbol values, wherein said transmitting comprises transmitting said wireless transmission based on said transformed set of transmission symbol values; and
applying a predefined coefficient-generation transformation to said video signal to generate a plurality of transformation coefficients representing said video, and wherein said original set of transmission symbol values comprise said plurality of transformation coefficients, wherein said coefficient-generation transformation comprises a transformation from a spatial domain to a frequency domain.

* * * * *